United States Patent [19]

Beale

[11] 3,937,018

[45] Feb. 10, 1976

[54] POWER PISTON ACTUATED DISPLACER PISTON DRIVING MEANS FOR FREE-PISTON STIRLING CYCLE TYPE ENGINE

[75] Inventor: William Taylor Beale, Athens, Ohio

[73] Assignee: Research Corporation, New York, N.Y.

[22] Filed: June 7, 1974

[21] Appl. No.: 477,359

[52] U.S. Cl. .......... 60/520; 62/6
[51] Int. Cl.² .......... F03G 7/06
[58] Field of Search .......... 60/520; 62/6

[56] References Cited

UNITED STATES PATENTS

| | | | |
|---|---|---|---|
| 3,487,635 | 1/1970 | Prast et al. | 60/520 |
| 3,550,371 | 12/1970 | Jaspers | 62/6 X |
| 3,600,886 | 8/1971 | Jaspers | 62/6 X |
| 3,828,558 | 8/1974 | Beale | 60/520 |

*Primary Examiner*—Martin P. Schwadron
*Assistant Examiner*—H. Burks, Sr.
*Attorney, Agent, or Firm*—Harold L. Stowell

[57] ABSTRACT

Drive means for the displacer piston of a free-piston Stirling type motion device comprises a rod which has one end connected to the displacer piston, while the other end, which has a small piston thereon, is mounted for limited axial movement in a cylinder zone formed in a power piston or in a stationary cylinder. A pair of gas passages connect opposite sides of the small piston to a source of compressed gas. The source of compressed gas is created by movement of the power piston.

6 Claims, 2 Drawing Figures

Figure 1:
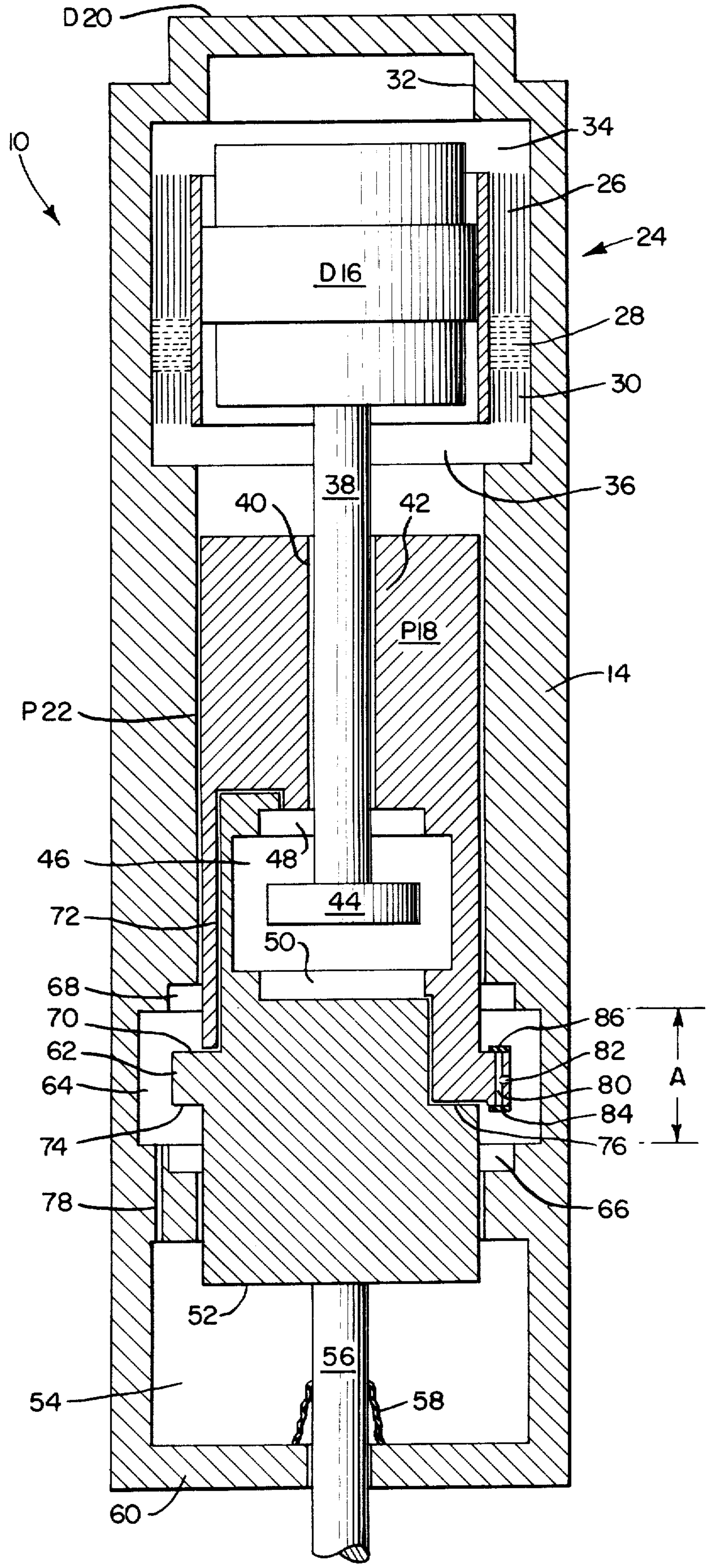

POWER PISTON ACTUATED DISPLACER PISTON DRIVING MEANS FOR FREE-PISTON STIRLING CYCLE TYPE ENGINE

BACKGROUND OF THE INVENTION

U.S. Pat. No. 3,552,120 - William T. Beale discloses a Stirling cycle thermal engine or refrigerating device wherein there is no primary mechanical connection between the displacer pistons and their associated power pistons. In my patent, the use of the displacer piston rod as a displacer movement initiating means is disclosed and claimed. This application is directed to alternate means for initiating motion in the displacer piston wherein means cooperating with the displacer piston rod and the power piston causes the displacer piston to move at a fixed point in the travel of the power piston, thus insuring rapid displacer piston motion at the proper portion of the engine's cycle resulting in more complete transfer of the gases between the hot and cold displacer cylinder spaces which in turn results in an increased cyclic work potential of the engine.

It has been found that any influence which results in improper displacer phasing can result in poor distribution of the hot and cold gases during expansion and compression giving rise to thermal hysteresis and lower thermal efficiency as discussed in SAE Paper 730647, June 18 – 22, 1973.

THE INVENTION

It has been found that by controlling the initiation of the displacer piston movement by a fluid pressure coupling between the displacer piston and the power piston so that the displacer piston moves at a fixed point in the power piston travel such disadvantages of the free-piston Stirling cycle type engine are avoided.

In general, the present invention comprises a free-piston Stirling type engine including a displacer piston and a power piston, each mounted for reciprocation in respective displacer piston and power piston cylinder zones, means for adding heat to and withdrawing heat from opposite ends of the displacer cylinder zone and drive initiating means for the displacer piston comprising a rod, means connecting one end of the rod to one end of the displacer piston, a small piston on the other end of said rod, a cylinder for said small piston formed in the power piston having a length to permit limited axial movement of the small piston relative to the power piston, or to a stationary cylinder, and a pair of gas passages connecting opposite sides of the small piston to an alternating source of compressed gas to thereby initiate movement of the small piston and its rod connected displacer piston.

Throughout the specification and claims hereof, the terms Stirling cycle type engine or device are intended to include an engine, a refrigerator, and/or a heat pump and the like.

Figure 2:
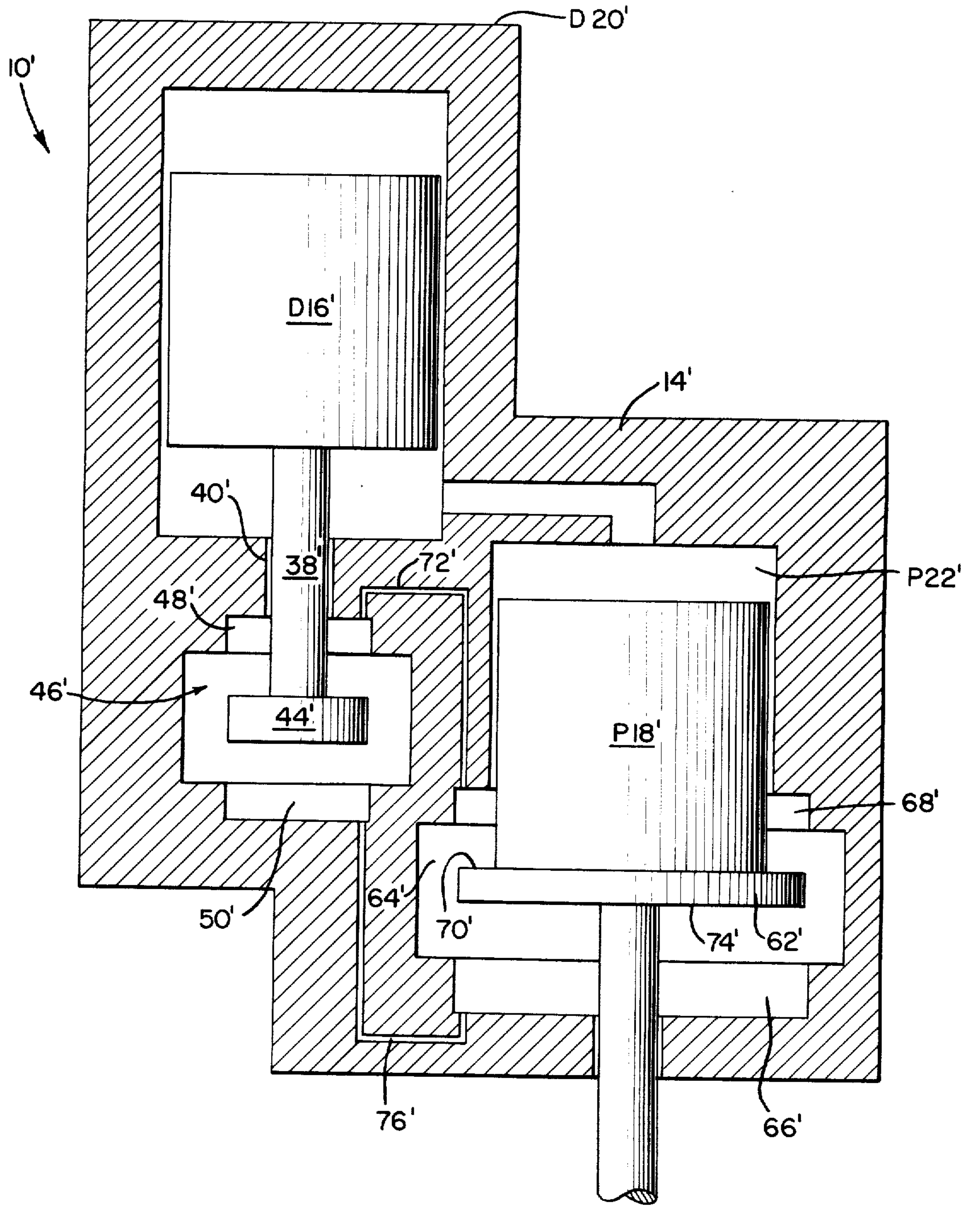

The invention will be more specifically described in reference to the drawing wherein:

FIG. 1 shows a free-piston type Stirling cycle device having a displacer piston and a power piston constructed in accordance with the teachings of this invention; and FIG. 2 shows a modified form of the invention.

SPECIFIC DESCRIPTION

The principles of Stirling cycle thermal devices are well known in the art and a relatively comprehensive review of past and recent developments in Stirling thermal engines and the comparison of such engines with the Otto, Brayton, Carnot, and Ericsson cycle engines is found in Volume 68, SAE Transactions, 1960, pp. 665–684. Since the principles of Stirling thermal cycle devices are well known to those skilled in the art, the following detailed discussion will be restricted to the improvements in the art brought about by the present invention.

Referring to FIG. 1 of the drawing, 10 generally designates a Stirling cycle type thermal device which includes a housing 14. The housing 14 encloses a displacer piston D 16 and a power piston P 18. Associated with the displacer piston D 16 is a displacer piston cylinder D 20 and the power piston has a power piston cylinder P 22.

Associated with the displacer cylinder D 20 is a combined heat exchange means and regenerator generally designated 24, which includes a heater portion 26, a regenerator portion 28, and a cooler 30. The elements may take the form such as shown in FIG. 6 of my said U.S. Pat. No. 3,552,120. The heater 26 communicates with the end 32 of cylinder D 20 through the opening 34 while the cooler 30 communicates with the opposite end of the cylinder D 20 via opening 36.

The displacer piston D 16 has mounted thereto a displacer piston rod 38. The displacer piston rod 38 passes through a bore 40 in the upper end 42 of the power piston P 18. The displacer rod 38 has provided at its opposite end a small piston designated 44 which operates in a cylinder or bore 46 within the power piston P 18. The bore 46 has two end chambers 48 and 50 of a diameter only slightly larger than the diameter of the piston 44 so that active spaces or zones are provided at the limits of movement of the small piston 44.

The pair of spaces 48 and 50 are axially spaced from each other a distance equal to the distance A which comprises the desired power piston stroke. The lower end of the power piston 52 operates in a bounce space or zone 54 and the power piston has connected thereto a power piston rod 56 which is provided with a rolling or bellows type seal or other appropriate seal 58 where it projects through the end 60 of the housing 14.

It will be noted that the power piston P 18 is provided with an enlarged band or ring 62 which operates in an enlarged bore 64 provided with reduced diameter end portions defining active spaces or chambers 66 and 68. Gas adjacent face 70 of the band 62 on the power piston P 18 is in communication with the active space 48 via an internal gas passage 72 while the opposite face 74 of the enlarged portion 62 of the power piston P 18 communicates with the active space 50 via internal gas passage 76. Further, a bore 78 in a portion of the housing 14 permits communication between the gas in the bounce space 54 and the zone 64 within which the enlarged portion of the power piston reciprocates.

To complete the assembly, the enlarged portion 62 of the power piston P 18 is provided with an internal bore 80 and a cross bore 82. The ends of bore 80 are provided with flapper type check valves 84 and 86. These valves maintain the gas pressure in active zones 48 and 50 at not less than the pressure of the gas in the bounce zone 54, thereby avoiding premature return motion of the displacer piston as the power piston rebounds at either end of its stroke and tends to reduce gas pressure in the zones 48 and 50.

The operation of the device, when functioning as an engine with heat being added to heater 26 by suitable heating means; with the displacer piston D 16 and the power piston P 18 moving toward end 60 of the housing 14; and with the cylinders D 20 and P 22 charged with, for example, hydrogen gas at, for example, 2,000 psi; will be described hereinbelow.

Under these conditions, as the power piston P 18 moves into the bounce space 54 between piston face 52 and end wall 60 of the housing 14, gas is trapped in such bounce space and in zone 64. Adjacent the extreme movement of the power piston P 18 gas is also trapped in space 66 by the enlarged portion 62 of the piston and the trapped gas will be forced through passage 76 to space 50. It will be noted that the small displacer drive piston 44 will be positioned in the active space 50 during this stage of the combined movement of the displacer piston D 16 and the power piston P 18 toward end 60 of the housing. The increased gas pressure in space 50 will then drive the small piston 44 toward end 32 of the displacer cylinder D 20 and in turn the displacer piston D 16. After the displacer piston D 16 commences to move toward end 32 of the displacer piston cylinder D 20, the pressure in gas bounce space 54 drives the power piston P 18 away from end 60 of the housing. The power piston and the displacer piston will continue to move away from end wall 60 of the housing 14 until gas trapped in the active space 68 is transmitted through internal bore 72 to active space 48 where it will act against the displacer piston rod piston 44 which will force the displacer D 16 in the opposite direction or toward wall 60 of housing 14 and its motion in that direction will cause the reversal of direction of movement of the power piston P 18 and the cycle repeats.

Referring to FIG. 2 of the drawing, 10' shows a modified form of the present invention wherein the cylinder zone for the small piston connected to the displacer piston rod is formed in a stationary block and the power piston is remote from the displacer piston. The housing 14' encloses a displacer piston D 16' and a nonaxially aligned power piston P 18'. The displacer piston reciprocates in a displacer piston cylinder D 20' and the power piston reciprocates in a power piston cylinder P 22'.

Associated with the displacer piston cylinder D 20' is a conventional combined heat exchange means and regenerator like the combined heat exchange means and regenerator 24 of the FIG. 1 form of the invention.

The displacer piston D 16' has mounted thereto a piston rod 38' which has a small piston 44' formed at the lower end thereof. The piston 44' reciprocates in a cylinder 46' having two end chambers 48' and 50' which are only slightly greater in diameter than the diameter of the small piston 44' so that active spaces or zones are provided at the limits of movement of the small piston, which limits are defined by the limits of movement of the displacer piston D 16'.

The power piston P 18' is provided with an enlarged band or ring 62' at its lower end which band operates in an enlarged bore 64' provided with reduced diameter end portions defining active spaces or chambers 66' and 68' at the extremities of the enlarged bore 64'.

Gas adjacent face 70' of the band 62' is in communication with the active space 48' via an internal gas passage 72' while the opposite face 74' of the enlarged portion 62' of the power piston P 18' is in communication with the active space 50' via internal gas passage 76'.

The band 62' may also be provided with suitable check valves as hereinbefore described in reference to the form of the invention shown in FIG. 1. Operation of this form of the invention is substantially identical to operation of the form of the invention illustrated in FIG. 1 and movement of the displacer piston is brought about by pressure created in zones 66' or 68' transmitted to zones 50' or 48' depending on the direction of movement of the power piston P 18'.

As is known in the art, the power piston may be returned by springs and/or a combination of springs and compressed gas as shown and described in reference to FIGS. 12 and 13 of my U.S. Pat. No. 3,552,120. It will be further appreciated that instead of a single power piston and a single displacer piston, dual interconnected displacers and power pistons may be employed with the displacer phasing mechanism of this invention and suitable displacer piston and power piston arrangements are illustrated, for example in FIGS. 1 and 2 of my said U.S. Pat. No. 3,552,120.

From the foregoing description of a specific embodiment of the present invention, it will be seen that the recited and other advantages are fully accomplished.

I claim:

1. A free-piston Stirling cycle type engine including a displacer piston and a power piston, each mounted for reciprocation in respective displacer piston and power piston cylinder zones, means for adding heat to and withdrawing heat from opposite ends of the displacer cylinder zone and phasing means for the displacer piston comprising a rod, means connecting one end of the rod to one end of the displacer piston, a small piston on the other end of said rod, a cylinder for said small piston, and a pair of gas passages connecting opposite sides of the small piston to alternating sources of compressed gas initiated by the power piston to thereby initiate movement of the small piston and its rod connected displacer piston at an appropriate point in the power piston travel.

2. A free-piston Stirling cycle type engine including a displacer piston and a power piston, each mounted for reciprocation in respective displacer piston and power piston cylinder zones, means for adding heat to and withdrawing heat from opposite ends of the displacer cylinder zone and phasing means for the displacer piston comprising a rod, means connecting one end of the rod to one end of the displacer piston, a small piston on the other end of said rod, a cylinder for said small piston formed in the power piston having a length to permit limited axial movement of the small piston relative to the power piston, and a pair of gas passages connecting opposite sides of the small piston to alternating sources of compressed gas initiated by the power piston to thereby initiate movement of the small piston and its rod connected displacer piston at an appropriate point in the power piston travel.

3. The invention defined in claim 1 wherein the source of compressed gas comprises gas compressed by the power piston as it is moved by movement of the displacer piston from the hot zone of the displacer cylinder.

4. The invention defined in claim 1 wherein the source of compressed gas is formed by gas compressing zones adjacent travel limits of the power piston.

5. The invention defined in claim 4 wherein said gas compressing zones are defined by a pair of annular spaces in the power piston cylinder and a cooperating ring formed on the power piston.

6. The invention defined in claim 5 including an axial gas passage in said ring and check valves at the extremities of said axial gas passage to maintain the gas pressure in the pair of annular spaces not less than gas pressure in the gas rebound space.

* * * * *